Jan. 31, 1933.　　　W. W. KLYCE　　　1,895,802
PRESSURE GAUGE
Filed Aug. 3, 1928
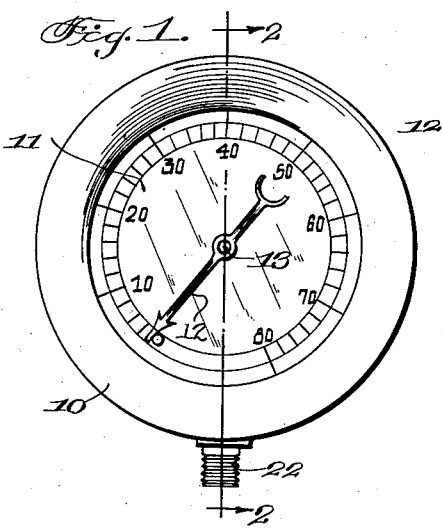
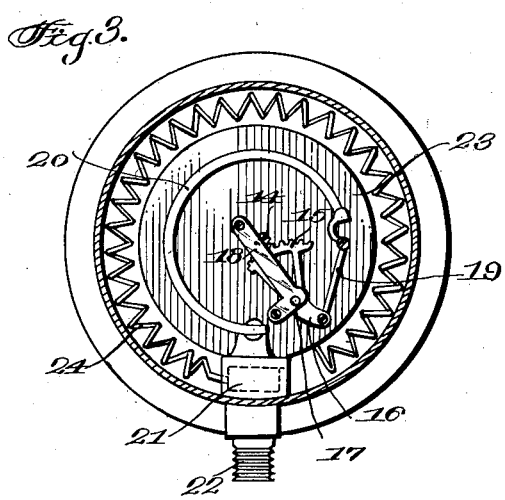
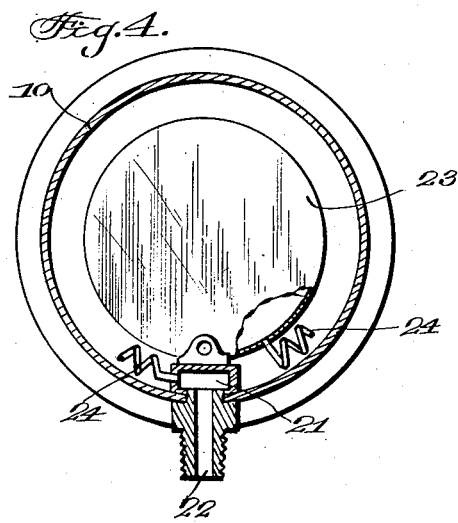
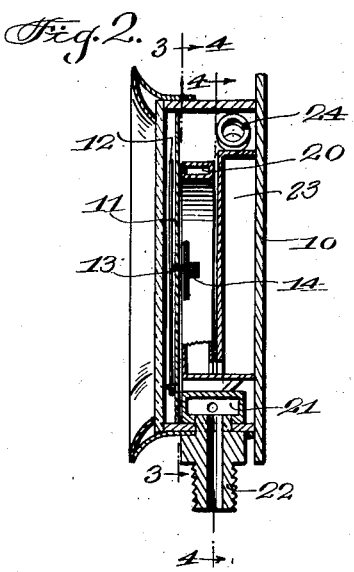
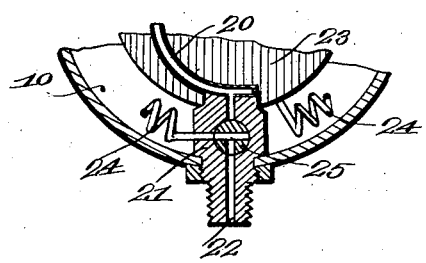
INVENTOR
W. W. Klyce
BY
ATTORNEY Patented Jan. 31, 1933

1,895,802

UNITED STATES PATENT OFFICE

WINNIFORD W. KLYCE, OF PONTIAC, MICHIGAN

PRESSURE GAUGE

Application filed August 3, 1928. Serial No. 297,157.

This invention appertains to impovements in pressure gauges generally, and more particularly to a type of such gauges as are usually employed in connection with air compressors, pumps and the like.

An object of the invention is to provide a gauge of the class set forth, which will be entirely free from vibration when indicating the pressures, such as would be obtained at the outlet of an air compressor, or other similar device.

Another object of the invention is to provide a gauge as hereinbefore characterized which embodies a means for smoothing out the fluctuations and pulsations in the pressure being measured, whereby the index will be substantially free from vibration, and as a consequence whereof will give a true and accurate reading of the pressure being produced or created by the compressor, or other apparatus with which it is associated.

A further object of the invention is to provide a means capable of being incorporated in the structures of known and standard types of either indicating or recording pressure gauges, whereby to eliminate the vibrations and fluctuations or pulsations aforesaid from the same for the stated purposes, and also to minimize the wear and tear on the operative parts or the indicating or recording mechanism.

With the foregoing and other equally important objects and advantages in view, the invention resides in the certain new and useful combination, construction and arrangement of parts as will be hereinafter more fully described, set forth in the appended claims, and illustrated in the accompanying drawing, in which:

Figure 1 is a front elevation of a typical form of the pressure gauge,

Figure 2 is a vertical section taken on the line 2—2 of Figure 1,

Figure 3 is another vertical section taken on the line 3—3 of Figure 2,

Figure 4 is a similar sectional view taken on the line 4—4 of Figure 2, and

Figure 5 is a fragmentary vertical section of a slightly modified form of the invention.

Referring to the drawing wherein like characters of reference designate corresponding parts throughout the several views thereof, and more particularly to Figures 1 to 4, the embodiment of the invention, as shown therein by way of example includes a typical indicating mechanism enclosed within a casing 10, which has a glass covered sight opening through which the dial face 11 and the index 12 cooperating therewith are exposed to view. The mechanism referred to consists of a shaft 13 journalled through the center of the dial 11, which has the index secured on its front end, and a pinion 14 on its rear end. This pinion 14 is disposed in mesh with a substantially sector shaped rack 15 carried at one end of an arm 16, which is pivoted, as at 17, at a point intermediate its ends to a bracket 18. The free end of the arm 17 is connected by a hinged link 19 to the free end of a Bourdon tube 20. The opposite end of the Bourdon tube 20 is fixedly secured to the pressure receiver 21, which is communicated by the nippled inlet 22 to be connected to the pressure source (not shown).

In the first instance of the present invention, however, the fixed end of the Bourdon tube 20 is preferably connected to a pressure equalizing chamber 23 arranged in the rear side of the casing 10, rather than to the receiver 21, as before stated, and pressure is led from the receiver 21 to the equalizing chamber 23 through a spirally coiled tubing 24, whereby fluctuations or pulsations in the pressure will be smoothed out, or otherwise eliminated before it passes from the equalizing chamber 23 to the Bourdon tube 20. Thus, the usual vibration in the indicating mechanism of the instrument, and the consequent wear and tear on the same, will be minimized, if not entirely eliminated, and an accurate, true reading of the amount of the pressure will be indicated at the index 12. This elimination of the fluctuations or pulsations in the pressure obtains by reason of the constricted bore of the tubing 24, and also from the many reversals of the flow of the pressure in the several convolutions or spirals in which the tubing 24 is formed.

In Figure 5, the Bourdon tube 20 has its fixed end secured directly to the inner side of the pressure receiver 21, in the usual manner, but is also in communication with the equalizing chamber 23. In this instance of the invention, however, the receiver 21 is provided with a three-way cock or by-pass valve 25, whereby the instrument may be permitted to function as an ordinary pressure gauge by setting the cock or valve 25 to admit pressure directly from the receiver 21 to the fixed end of the Bourdon tube 20, if desired, or otherwise the cock or valve 25 will be set to cause the pressure to flow from the receiver 21 to the fixed end of the Bourdon tube 20, through the tubing 24 and equalizing chamber 23.

It is to be noted that this arrangement of the invention is applicable to either of the ordinary indicating or recording gauges of any type.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A pressure gauge comprising a casing, a nippled inlet in one side of said casing, a Bourdon tube, a pressure equalizing chamber within said casing at one side of said Bourdon tube and having communication with the supported end of the latter, and and a conduit extending about the interior of said casing and establishing communication between said inlet and said chamber for conveying fluid under pressure to the latter and thence to said Bourdon tube, said conduit being arranged to prevent fluctuations in the pressure therein.

2. A pressure gauge comprising a circular casing, a nippled inlet opening inward of the peripheral wall of said casing, a Bourdon tube within said casing and supported from the inner end of said inlet, a pressure indicating mechanism operably connected to the free end of said Bourdon tube, a pressure equalizing chamber formed within said casing in the rear of said Bourdon tube and the indicating mechanism, and having communication with the supported end of said Bourdon tube, and a substantially spiral conduit within said casing and extending adjacent the peripheral wall thereof and between the said inlet and the chamber for conveying fluid under pressure to the latter and thence to said Bourdon tube, said conduit being arranged to prevent fluctuations in the pressure during its passage therethrough.

3. A pressure gauge comprising a casing, a nippled inlet in one side of said casing, a Bourdon tube within said casing and supported at one end on the inner end of said inlet, and having communication therewith, a pressure indicating mechanism operatively connected to the free end of said Bourdon tube, a pressure equalizing chamber within said casing at one side of said Bourdon tube and having communication with the supported end of the latter, and a conduit extending about the interior of said casing and establishing communication between said inlet and said chamber for conveying fluid under pressure to the latter and then to said Bourdon tube, and a valve carried by the inner end portion of said inlet for controlling the passage of the fluid under pressure transmitted either from said inlet to said conduit or directly therefrom to the supported end of said Bourdon tube.

Signed at Pontiac, in the county of Oakland and State of Michigan, this 30 day of July, A. D. 1928.

WINNIFORD W. KLYCE.